E. E. THOMAS.
WHEEL.
APPLICATION FILED JULY 26, 1909.

969,673.

Patented Sept. 6, 1910.

2 SHEETS—SHEET 1.

WITNESSES

INVENTOR
EDWIN E. THOMAS
BY Paul & Paul
ATTORNEYS

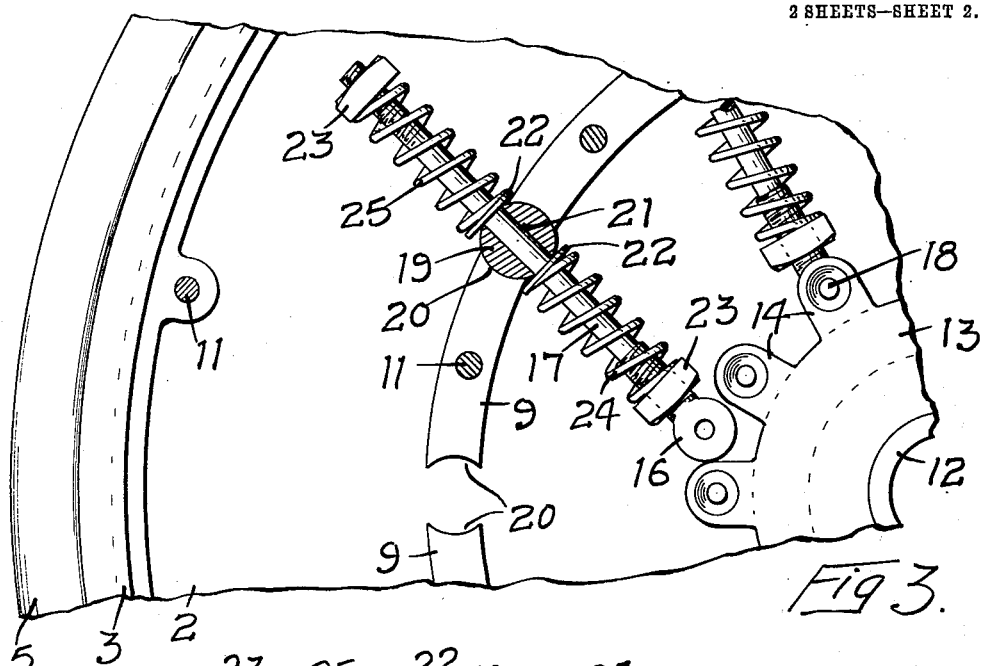
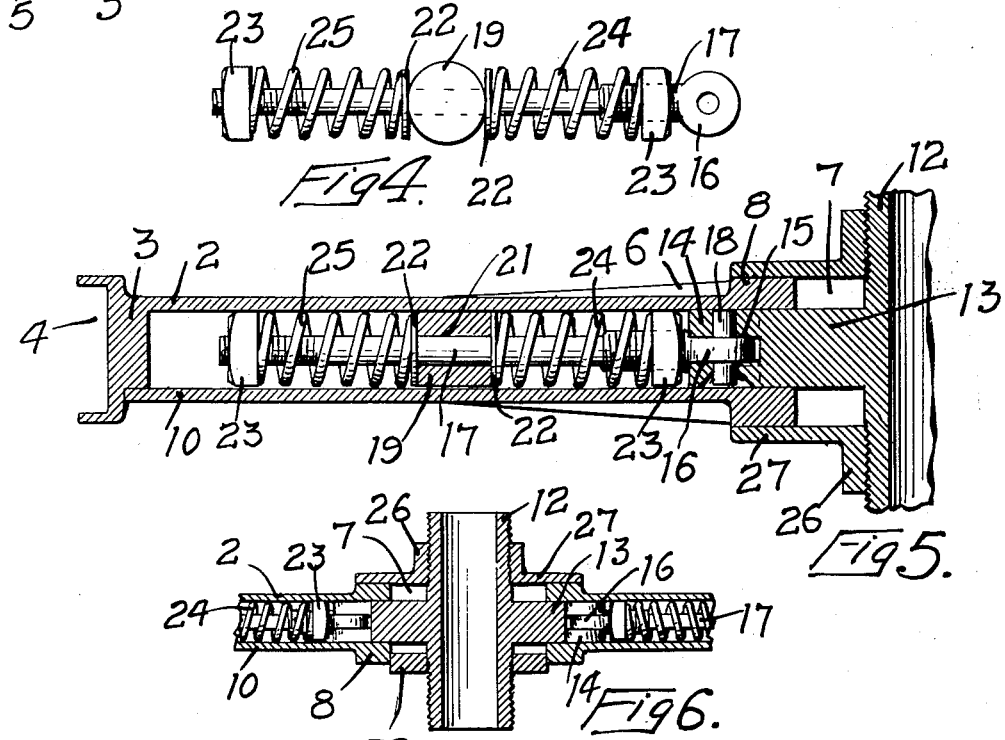
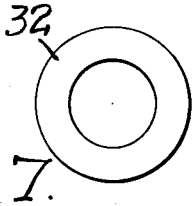

UNITED STATES PATENT OFFICE.

EDWIN E. THOMAS, OF PORTLAND, OREGON.

WHEEL.

969,673.  Specification of Letters Patent.  Patented Sept. 6, 1910.

Application filed July 26, 1909. Serial No. 509,722.

*To all whom it may concern:*

Be it known that I, EDWIN E. THOMAS, of Portland, Multnomah county, Oregon, have invented certain new and useful Improvements in Wheels, of which the following is a specification.

My invention relates to resilient wheels adapted particularly for automobiles and trucks of various kinds, although capable of use on vehicles of any style.

The object of my invention is to provide a wheel, possessing the characteristic of resiliency, without the use of a pneumatic tire.

A further object is to provide a wheel of simple, but strong and durable construction and one which can be made of any suitable size.

A further object is to provide a wheel, composed of comparatively few parts, all of which are readily accessible for examination or repairs.

Other objects of the invention will appear from the following detailed description.

The invention consists generally in various construction and combinations, all as hereinafter described and particularly pointed out in the claims.

Figure 1:
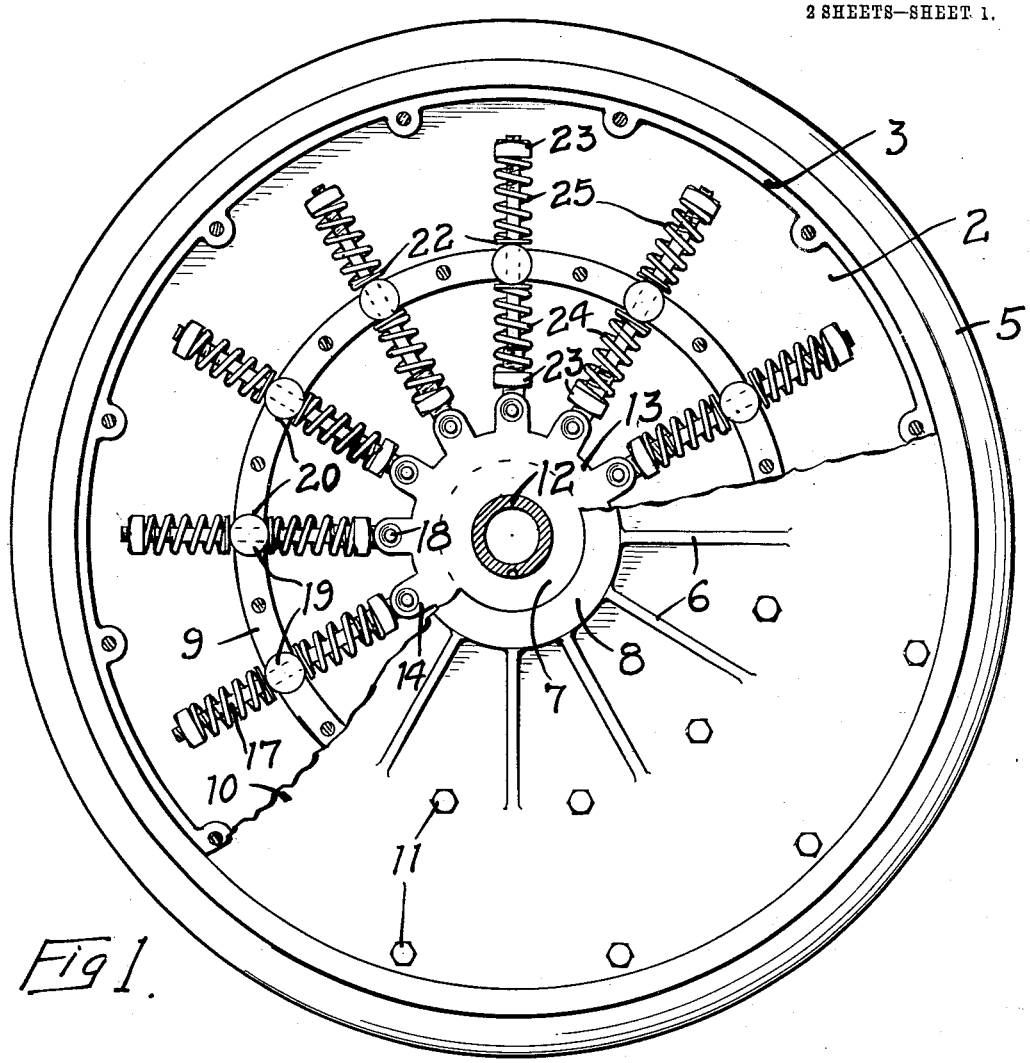
Figure 2:
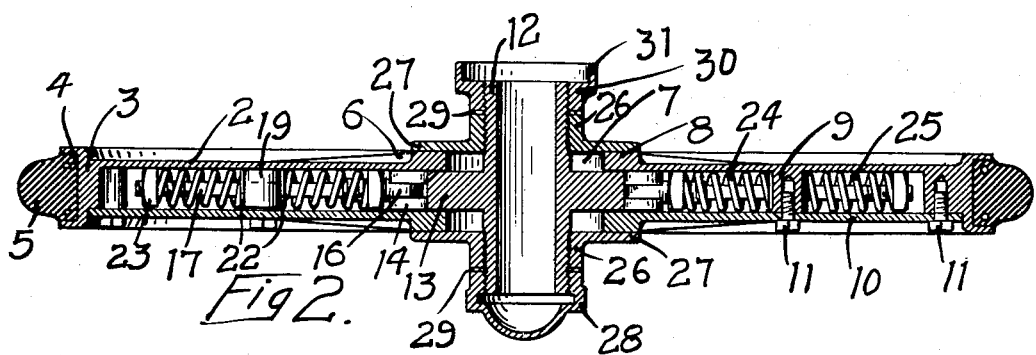

In the accompanying drawings, forming part of this specification, Figure 1 is a side elevation partially in section of a wheel embodying my invention, Fig. 2 is a horizontal, sectional view through the center of the wheel, Fig. 3 is a detail, sectional view, illustrating the manner of supporting the hub in the wheel, Fig. 4 is a detail of one of the hub supporting pins, Fig. 5 is an enlarged detail section, showing the position of the hub and a pivot pin in the wheel, Fig. 6 is a detail sectional view, showing the means for locking the floating hub, Fig. 7 is a view of the ring for locking the floating hub.

In the drawings, 2 represents a disk having a peripheral rim 3, provided with a seat 4 for the tire 5. This tire may be of any suitable material, but I have shown one herein of the ordinary solid rubber type. The disk has a series of ribs 6 radiating outwardly thereon, and a comparatively large central opening 7, around which a seat 8 is formed, for the purpose hereinafter described.

Intermediate to the rim 3 and the opening 7 is an annular flange 9 formed on the disk 2 and encircling the opening 7. A plate 10 is secured to the rim and to the flange 9 by screws 11, which are tapped into said rim and flange at suitable intervals, and said plate has a central opening, which registers with the opening 7 and a seat inclosing said opening corresponding to the seat 8. This flange forms a bracing means for the wheel disk and cover plate intermediate to the hub and rim and serves to greatly strengthen the wheel at this point. A space is thereby formed between the disk 2 and the plate 10, wherein the working parts of the wheel are arranged.

12 is a hub having exteriorly threaded ends projecting through the openings in the disk and plate and provided with a centrally arranged disk 13 that is adapted to slide between the disk and plate and be guided thereby. The disk 13 has a series of lugs 14 thereon, provided with slots 15 to receive tongues 16 on the inner ends of the rods 17, said tongues being held in said slots by means of short pivot pins 18.

Blocks 19 are provided fitting within sockets 20 in the flange 9 and capable of rotary movement therein and provided with holes 21, in which the rods 17 are slidable. Washers 22 are mounted on the rods 17 and between these washers and the adjusting nuts 23 springs 24 and 25 are coiled on the rods 17. These springs yieldingly support the hub 12, allowing it to slide horizontally or vertically between its guides and adapt itself to the load on the wheels, the opening 7 being of sufficient size to permit freedom of movement of the ends of the hub. These rods and springs are sufficiently near together so that a series of them above and below the hub will be affected with each movement thereof. The outer springs on the rods above the hub being put under compression, as it descends, and the inner springs or those between the hub and the flange 9 being compressed on the under side of the hub, and regardless of the movement of the hub, a series of the springs will be in position to resist such movement and take up the shock and jar of running over rough roads or when striking an obstruction.

The threaded ends of the hubs have interiorly threaded collars 26 thereon, provided with flanges 27, which are adapted to bear on the seats 8 and form a close joint therewith, allowing the hub to slide back and forth and adjust itself to the strain thereon. A cap 28 is screwed on one end of the hub to lock the collar in place, a suitable washer 29 being placed between them, and a nut 30 having a sand band 31 is provided for the opposite end of the hub. I also provide a ring 32 that is adapted to fit into the space between the hub and the seat 8 and at any time the operator may remove the outer collar and slip this ring into the recess where it will form a support for the hub and prevent it from sliding in either direction. The load will then be transmitted directly through the hub and the ring to the casing of the wheel. This ring is intended for use when breakage of the springs or their connections has temporarily disabled the floating hub and prevented it from performing its usual functions. Should this breakage occur out on the road, the driver of the car or truck can easily lock the hub against movement and use the wheel in a rigid form.

The removable plate as well as the disk 2 is provided with a series of radial ribs, which if preferred, may be painted a distinguishing color to represent the spokes of the wheel.

By providing the closed casing, in which the hub and the mechanism attached thereto are arranged, I am able to use a lubricating agent, such as flaked graphite or hard oil, preferably the former, which will work into all the joints and bearings and prevent rubbing and wear of the parts, the tight walls of the casing preventing the escape of the graphite.

By pivoting the pins on which the springs are mounted to the hub and depending on the wheel disk and cover plate for lateral strength, I am able to dispense with stops and guides of all kinds and provide a mechanism which is practically a spring transmission. Assuming the wheel to be driven from the hub, as in an automobile with a shaft drive, the hub will first rotate a certain distance ahead of the rim, or until the outside springs are in compression to a degree corresponding to the force required to drive the wheel. The closed chambers effectually protect the springs and the sliding rods from dust and dirt, and allow me to provide a suitable lubricating agent which will insure the smooth operation of the rods and springs and prevent undue wear.

I claim as my invention:—

1. A wheel comprising a disk having a peripheral rim and a central opening and an annular flange encircling said opening, intermediate to it and said rim, a cover plate also having a central opening registering with the opening in said disk and secured to said rim and flange, a hub fitting within said opening, said hub having a disk fitting between said first named disk and said plate and guided thereby, a chamber being formed between said hub and flange and between said flange and rim, means connected with said hub disk and having sliding pivotal connections with said flange, and means yieldingly resisting the movement of said hub disk between said wheel disk and plate.

2. A wheel comprising a disk having a central opening and a peripheral rim and an annular flange encircling said opening intermediate to the edge thereof and said rim, a cover plate also having a central opening and secured to said flange and rim, a hub fitting within the openings in said disk and plate and having a part that is slidable between said disk and plate, a series of rods pivotally connected with said part and radiating therefrom, blocks fitting within sockets in said flange and capable of rotation therein and having holes therethrough wherein said rods are slidable, said rods projecing through said blocks into the chamber formed between said flange and rim, and helical springs mounted on said rods on both sides of said flange and yieldingly resisting longitudinal movement of said rods.

3. A wheel, comprising a disk having a central opening and otherwise imperforate and provided with a peripheral rim and an annular flange encircling said opening and located intermediate to said opening and said rim, a cover plate having a central opening and otherwise imperforate and secured to said rim and flange and forming therewith and with said disk an inner and an outer closed chamber, a hub fitting within the openings in said disk and plate and having a disk that is slidable between said disk and plate, a series of rods pivotally connected with said hub disk and radiating therefrom and projecting through said flange and having sliding pivotal bearings therein, helical springs mounted on said rods on each side of said bearings and resisting longitudinal movement of said rods, said inner and outer chambers being adapted to contain a lubricating material, substantially as described.

4. A wheel comprising a disk having a central opening and a peripheral rim, a plate also having a central opening and secured to said rim, a hub fitting within said central openings and having a part that is slidable between said plate and disk, a series of rods pivotally connected to said hub, blocks having bearings, attached to the wheel structure, intermediate of said hub and rim, said blocks capable of rotation in their bearings and having transverse openings through which said rods project and slide, and the outer ends of said rods terminating intermediate to said blocks and the rim of said wheel, and free from connection with the wheel-rim, and springs mounted on said rods on each side of said blocks and yieldingly resisting the sliding movement of said hub, said blocks rotating freely in their bearings to allow said rods and springs to accommodate themselves to the position of the hub, substantially as described.

In witness whereof, I have hereunto set my hand this 14th day of July 1909.

EDWIN E. THOMAS.

Witnesses:
J. M. SULLIVAN,
J. A. BYINGTON.